US012392478B2

(12) United States Patent
Zhao

(10) Patent No.: US 12,392,478 B2
(45) Date of Patent: Aug. 19, 2025

(54) LAMP FIXING MEMBER, LAMP AND LAMP FIXING STRUCTURE

(71) Applicant: Xueliang Zhao, Ningbo (CN)

(72) Inventor: Xueliang Zhao, Ningbo (CN)

(*) Notice: Subject to any disclaimer, the term of this patent is extended or adjusted under 35 U.S.C. 154(b) by 0 days.

(21) Appl. No.: 18/812,937

(22) Filed: Aug. 22, 2024

(65) Prior Publication Data

US 2024/0410554 A1 Dec. 12, 2024

(30) Foreign Application Priority Data

Jun. 24, 2024 (CN) ......................... 202421453132.5

(51) Int. Cl.
*F21V 21/04* (2006.01)
*F21S 8/04* (2006.01)
*F21Y 115/10* (2016.01)

(52) U.S. Cl.
CPC .............. *F21V 21/047* (2013.01); *F21S 8/04* (2013.01); *F21S 8/043* (2013.01); *F21V 21/043* (2013.01); *F21V 21/045* (2013.01); *F21V 21/048* (2013.01); *F21Y 2115/10* (2016.08)

(58) Field of Classification Search
CPC ............ F21V 21/048; F21S 8/043; F21S 8/04
USPC .......................................................... 362/148
See application file for complete search history.

(56) References Cited

U.S. PATENT DOCUMENTS

2010/0309658 A1 12/2010 Rouse et al.
2011/0176319 A1* 7/2011 Hopkins ................. F21S 8/043 248/220.21
2013/0301267 A1* 11/2013 Badley .................... F21V 29/76 362/249.1
2016/0061395 A1 3/2016 White et al.
2019/0145611 A1* 5/2019 May ........................ F21S 8/043 362/147
2020/0200372 A1* 6/2020 Béland .................... F21V 21/14
2023/0304639 A1* 9/2023 Yan ....................... F21V 21/048

* cited by examiner

*Primary Examiner* — Laura K Tso

(57) ABSTRACT

The present invention discloses a lamp fixing member and a lamp and a lamp fixing structure. The lamp fixing member comprises a first fixing member and a second fixing member, the first fixing member and the second fixing member are movably connected to form a connected state or a disconnected state so as to fix the first fixing member on or disassemble it from the keel member.

14 Claims, 9 Drawing Sheets

LAMP FIXING MEMBER, LAMP AND LAMP FIXING STRUCTURE

TECHNICAL FIELD

The present invention belongs to the field of lighting fixtures, in particular to a lamp fixing member, a lamp and a lamp fixing structure.

BACKGROUND

Lighting fixtures are tools required for lighting in home and office space. The light sources include fluorescent tubes, LED lamp groups and other forms. For scenarios with suspended ceiling decoration, the lighting fixtures are usually embedded and installed in the suspended ceiling to replace one or more suspended ceiling tiles. For example, in kitchen or toilet decoration, the suspended ceiling tile is usually snap-fitted in the keel to achieve the purpose of lighting fixture installation. However, on the one hand, such an installation method requires for a specified shape of lamps that needs to be the size of one or two suspended ceiling tiles. On the other hand, since lamps replace the suspended ceiling tile, the original decorative layout of the suspended ceiling will also be damaged.

Therefore, it is necessary to develop a new lamp fixing member that does not damage the original decorative layout of the suspended ceiling. In addition, the convenience of installation and disassembly may also need to be considered in practical application, as well as allowing users to set up the installation shape of lamps according to their own needs to meet different use habits or requirements.

SUMMARY

The purpose of the present invention is to provide a lamp fixing member, which is easy to install and disassemble and has various shapes after assembly, as well as a lamp and a lamp fixing structure.

As a first aspect of the present invention, there is provided a lamp fixing member for fixing a lamp body to a keel member. The lamp fixing member comprises a first fixing member and a second fixing member. The first fixing member is connected with the lamp body, and the first fixing member and the second fixing member are movably connected to form a connected state or a disconnected state. In the connected state, the second fixing member fixes the first fixing member to the keel member, and in the disconnected state, the first fixing member can be disassembled from the keel member.

According to the above-mentioned lamp fixing member, the second fixing member is pivotally connected to the first fixing member for snap-fitting on or separating from the keel member by pivoting of the second fixing member.

According to the above-mentioned lamp fixing member, the second fixing member is detachably connected to the first fixing member to snap-fit the keel member on or separate it from the first fixing member through the second fixing member.

According to the above-mentioned lamp fixing member, when the second fixing member is pivotally connected, the lamp fixing member further comprises a fastener; the second fixing member comprises a fourth arm part and a fifth arm part, and the fourth arm part is pivotally connected with the first fixing member; the fourth arm part and the fifth arm part are respectively provided with a first fastening hole and a second fastening hole; the fastener is inserted into the first fastening hole and the second fastening hole to drive the fifth arm part to approach or move away from the fourth arm part by screwing of the fastener.

According to the above-mentioned lamp fixing member, the first fixing member comprises a first arm part and a second arm part. The first arm part is connected with or integrated with the second arm part. The fourth arm part is pivotally connected to the first arm part. The second arm part is connected with the lamp body.

According to the above-mentioned lamp fixing member, a pivotal part of the first fixing member and the second fixing member is convexly arranged to abut against the lower part of an upper flange of the keel member.

According to the above-mentioned lamp fixing member, the first fastening hole is a through hole and the second fastening hole is a threaded hole.

According to the above-mentioned lamp fixing member, both the first fastening hole and the second fastening hole are through holes, and a nut is provided outside the second fastening hole to threadably engage with the fastener.

According to the above-mentioned lamp fixing member, the fastener is a butterfly bolt.

According to the above-mentioned lamp fixing member, the fifth arm part is further provided with a clamping convex, and a guide edge is further arranged below the clamping convex.

According to the above-mentioned lamp fixing member, when the second fixing member is detachably connected, the second fixing member comprises a sixth arm part and a seventh arm part, the sixth arm part and the seventh arm part are spaced apart so as to form a snap-fit cavity therebetween; the first fixing member comprises a first arm part and a second arm part, the first arm part is connected with or integrated with the second arm part, and the first arm part fits to a side wall of the keel member and is fixed by the second fixing member in a snap-fit manner.

According to the above-mentioned lamp fixing member, the second fixing member is made of an elastic material so that it can be elastically snap-fitted, and the width of the snap-fit cavity is less than the fitting width between the first arm part and the keel member, so that the second fixing member is in a resiliently expanded state after being snap-fitted.

According to the above-mentioned lamp fixing member, the lamp fixing member further comprises a fastener; the first arm part and the sixth arm part are provided with a first fastening hole correspondingly, and the seventh arm part is provided with a second fastening hole; the fastener is inserted into the first fastening hole and the second fastening hole to drive the sixth arm part to approach or move away from the seventh arm part by screwing of the fastener.

According to the above-mentioned lamp fixing member, the first arm part comprises an eighth arm part and a ninth arm part, the ninth arm part is offset from and protruded relative to the eighth arm part, and a boss is formed at the connection therebetween.

According to the above-mentioned lamp fixing member, when the second fixing member is elastically snap-fitted, a fastening slot and a fastening point are provided on the sixth arm part and the first arm part, respectively; the fastening slot is in concave-convex fit, friction fit or magnetic fit with the fastening point to position the second fixing member.

As a second aspect of the present invention, there is provided a lamp fixing member for fixing the lamp body to the keel member. The lamp fixing member comprises a third fixing member and a fastener, the third fixing member is fixedly connected to the keel member, and the third fixing member is detachably connected with the lamp body.

The third fixing member comprises a connecting arm and a locking arm arranged on both sides of the keel member, respectively, a fastening slot for providing at least part of the keel member therein is formed between a connecting arm and a locking arm, and the fastener acts between the connecting arm and the locking arm to press or unscrew them.

According to the above-mentioned lamp fixing member, the connecting arm and the locking arm are respectively provided with a first fastening hole and a second fastening hole, respectively.

According to the above-mentioned lamp fixing member, the connecting arm is detachably connected with the lamp body through a second arm part.

According to the above-mentioned lamp fixing member, wherein the first fastening hole is a through hole, and the second fastening hole is a threaded hole. The fastener is arranged passing through the first fastening hole and threadably engaged with the second fastening hole to drive the connecting arm to approach or move away from the locking arm by screwing of the fastener.

According to the above-mentioned lamp fixing member, both the first fastening hole and the second fastening hole are through holes. After passing through the first fastening hole and the second fastening hole, the fastener is threadably engaged with a separately provided nut, so that the connecting arm can be pressed or unscrewed to approach or move away from the locking arm.

According to the above-mentioned lamp fixing member, the fastener is a butterfly bolt for convenience of manual screwing.

According to the above-mentioned lamp fixing member, a lower end of the second arm part is bent downwards to form a third arm part, and the third arm part is spaced from the second arm part; the third arm part is further provided with a connecting positioning piece, and the connecting positioning piece abuts against a side wall or an inner wall of the lamp body fixing slot of the lamp body.

According to the above-mentioned lamp fixing member, the third arm part is arranged in parallel and spaced from the second arm part, and the connecting positioning piece comprises at least either a first positioning piece protruding on the third arm part or a second positioning piece formed on the third arm part.

As a third aspect of the present invention, there is provided a lamp comprising a lamp body and at least one lamp fixing member, wherein the lamp fixing member is any one of the above-mentioned lamp fixing member.

As a fourth aspect of the present invention, there is provided a lamp fixing structure comprising a keel member, a lamp body and a lamp fixing member, wherein the lamp fixing member is any one of the above-mentioned lamp fixing member.

According to the above-mentioned lamp fixing structure, the keel member comprises a keel riser, and an upper flange is formed at the top of the keel riser for clamping the locking part of the lamp fixing member below it.

According to the above-mentioned lamp fixing structure, a lamp body fixing slot is provided on the top surface of the lamp body, and the lamp body fixing slot has an "L" or "I" cross-sectional shape.

According to the above-mentioned lamp fixing structure, a hanger platform is further provided at a lower end of the keel riser, and the second arm part is arranged fitting to the hanger platform, so that the suspended ceiling tile is carried by the second arm part and the lamp body is arranged adjacent to a lower surface of the keel member or the suspended ceiling tile.

According to the above-mentioned lamp fixing structure, the third arm part is positioned in a tight or magnetic fit with the lamp body fixing slot, so that the position of the lamp body can be adjusted relative to the lamp fixing member.

According to the above-mentioned lamp fixing structure, the lamp fixing structure further comprises a cable fixing member, the cable fixing member comprises a cable fixing body and a cable fixing buckle detachably connected with each other; the cable fixing body comprises a first body and a second body, and the second body is fixedly connected with the keel member and the lamp body; the cable fixing buckle comprises a cable trough and a second buckling piece, a first buckling piece is provided on the first body, and the first buckling piece is detachably connected with the second buckling piece.

According to the above-mentioned lamp fixing structure, after assembly, the lamp fixing structure makes each lamp body in a linear, rectangular or cross-shaped layout.

The lamp fixing member, the lamp and the lamp fixing structure of the present invention have at least the following beneficial effects:

1. The lamp body is fixed to the keel member through a lamp fixing member. The lamp fixing member is specifically composed of a first fixing member and a second fixing member movably arranged with each other, wherein the first fixing member is connected with the lamp body and fitted to a side wall of the keel member, and the first fixing member and the keel member are fixedly connected with each other through the second fixing member. The second fixing member can be, relative to the first fixing member, fixed or disassembled by a pivoting structure or a detachable snap-fit structure, so that the fixing and stabilization between the lamp body and the keel member can be realized for the convenience of installation and disassembly.
2. The lamp body is attached and fixed below the keel member, so that the shapes formed by multiple lamp bodies can be set as required, such as rectangular, square, L-shaped, cross-shaped, etc., providing a very flexible installation convenience and diversified assembly effects.
3. The lamp body can be slidably arranged relative to the lamp fixing member, so that the position of the lamp body can be adjusted within the setting range as required. This can form the above-mentioned diversified installation shapes when adjacent lamp bodies are spliced.
4. The lamp body is located at the junction of adjacent suspended ceiling tiles, which will not weaken the decorative effect of the suspended ceiling tiles.

Figure 1:
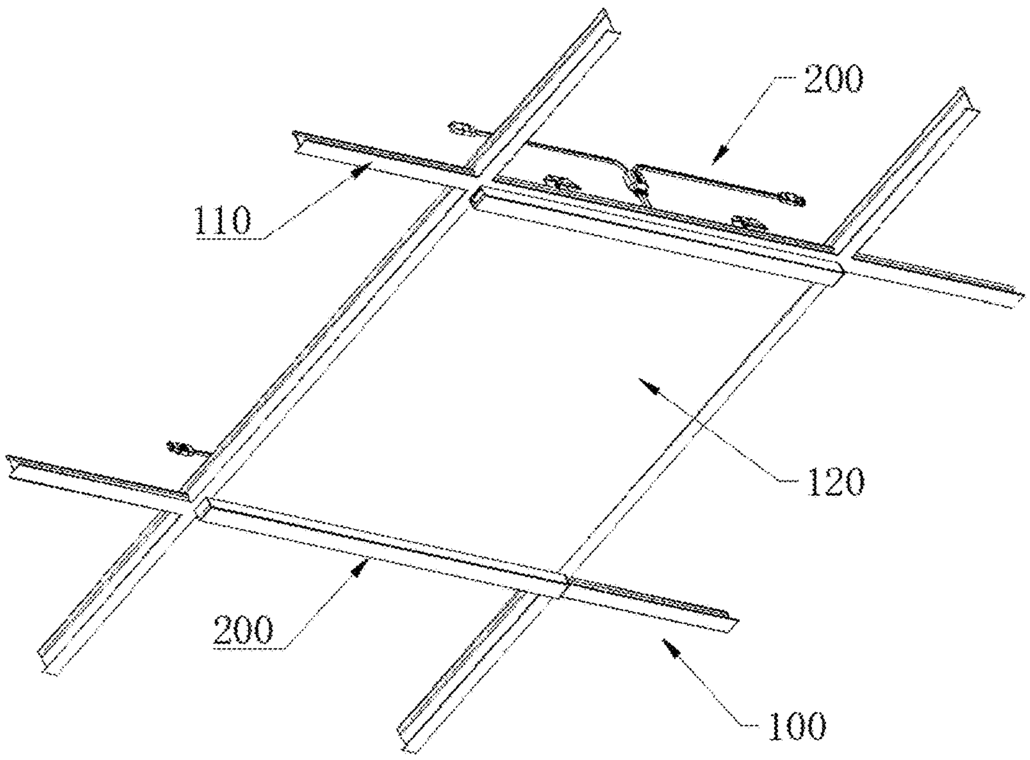
FIG. 1 is a schematic diagram of the use state where the lamp body is fixed on the keel by the lamp fixing member according to Embodiment I of the present invention, which is from a bottom perspective.

REFERENCE NUMERALS IN THE DRAWINGS keel 100, keel member 110, suspended ceiling tile 120, keel riser 111, hanger platform 112, upper flange 113, slot 114 and hanger hole 102, lamp 200, lamp body 210, lamp fixing member 220, power cord 201, connection sub-wire 202, sub-wire connector 203, pivot axis 204, lamp body fixing slot 211, slot wall 212, first fixing member 221, second fixing member 222, fastener 223, fastening slot 224, connecting piece 225, first positioning member 226, third fixing member 227, connecting arm 228, locking arm 229 and top arm 230, first arm part 241, second arm part 242, third arm part 243, first pivot member 244, second positioning member 245, fourth arm part 251, fifth arm part 252, guide edge 253, second pivot member 254, first fastening hole 255, second fastening hole 256, pivotal part 257, clamping convex 258, sixth arm part 261, seventh arm part 262, snap-fit cavity 263, fastening slot 264, fastening point 265, limiting piece 266, eighth arm part 267, ninth arm part 268, boss 269, cable fixing member 270, cable fixing body 271, cable fixing buckle 272, first body 273, second body 274, first buckling piece 275, second buckling piece 276, cable trough 277, buckle hole 278 and clamping table 279.

DETAILED DESCRIPTION OF THE EMBODIMENTS

The protection scope of the present invention will be described in detail below with reference to embodiments and drawings of the present invention. It should be noted that the following descriptions are examples, and their purpose is to facilitate understanding but not limit the protection scope of the present invention. All conventional changes made on the basis of embodiments shall fall within the protection scope of the present invention.

Embodiment I

As shown in FIGS. 1-6, a lamp fixing structure is used to fix the lamp 200 on the keel 100 so that an assembled state as shown in any of FIG. 15, 16, 17, 18 or 19 can be formed, wherein the lamp bodies 210 of the lamp 200 may have equal or different lengths, and each assembled lamp body 210 is generally arranged below the keel member 110 to which it is fixed.

Figure 2:
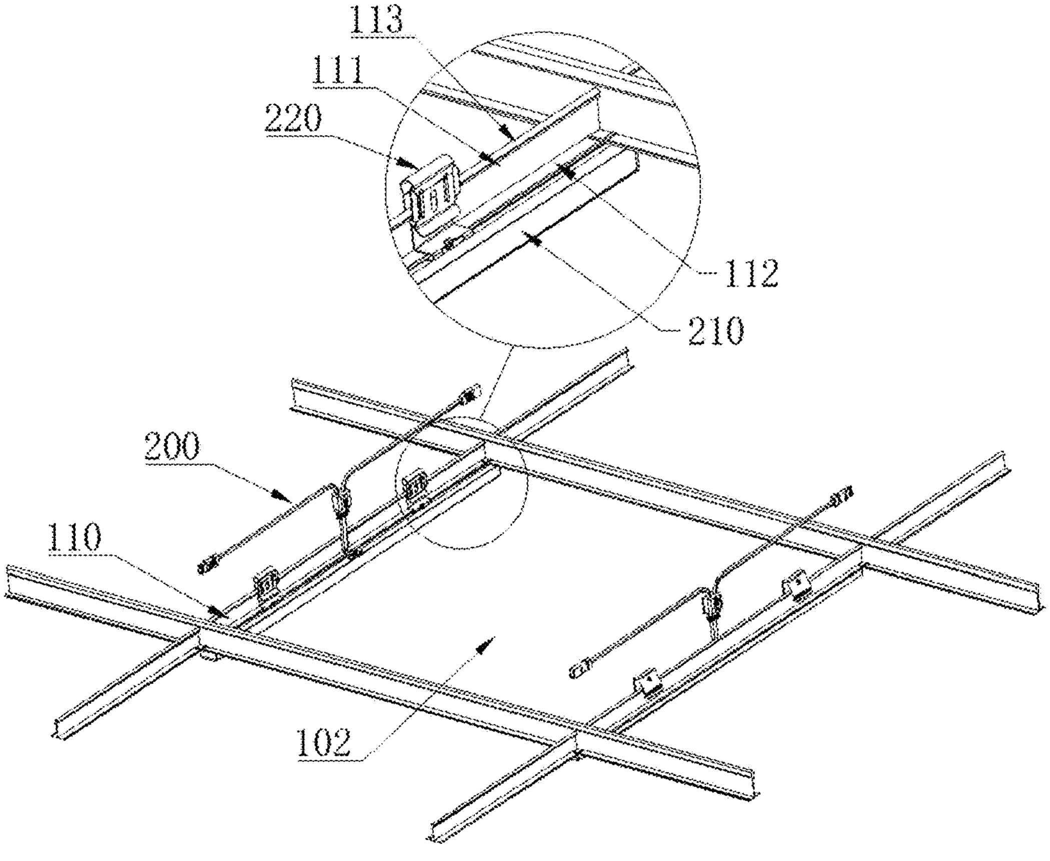
FIG. 2 is a structural schematic diagram and its partial enlarged schematic diagram with the suspended ceiling tile hidden in the embodiment of FIG. 1, which are from a top perspective.
Figure 3:
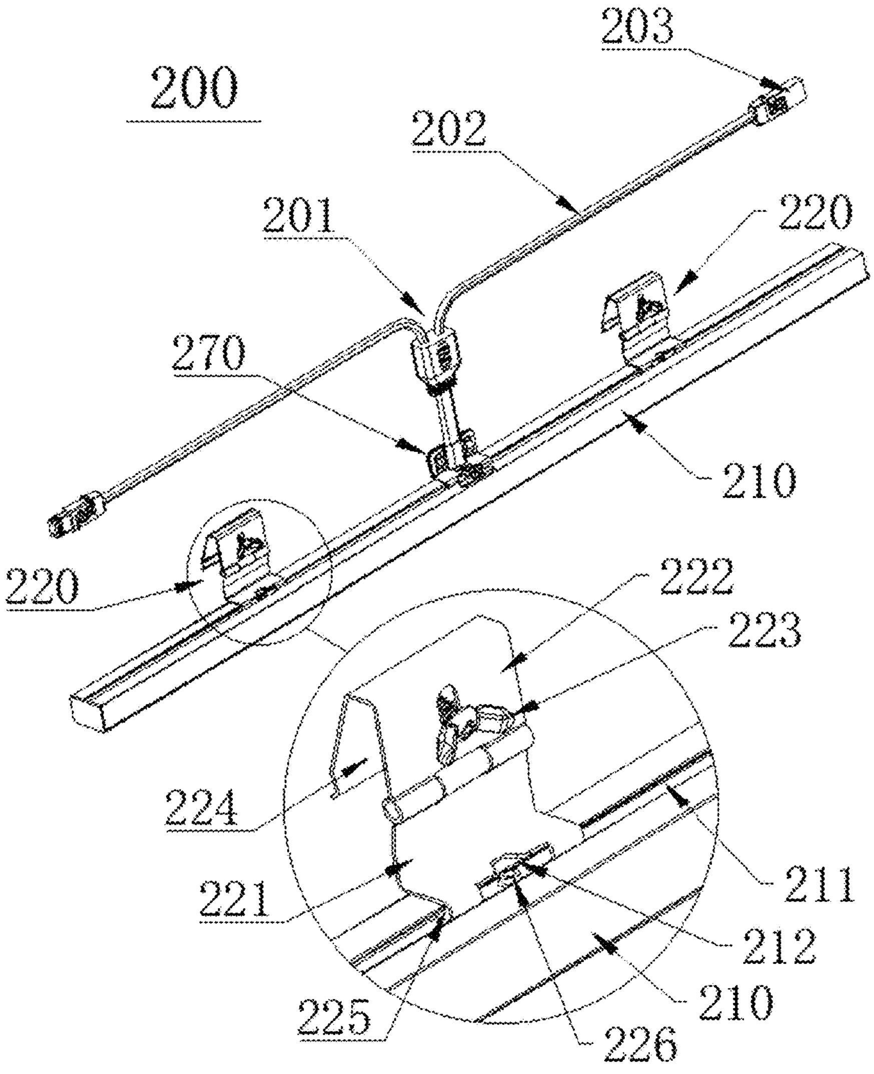
FIG. 3 is a structural schematic diagram and its partial enlarged schematic diagram of the lamp according to the embodiment shown in FIG. 1.

As shown in FIGS. 2-3, the lamp 200 of this embodiment is composed of a lamp body 210 and a power cord 201 for supplying power to the lamp body 210. The lamp body 210 has several LED beads or LED light emitting modules for lighting. The power cord 201 comprises two connection sub-wires 202, one end of each connection sub-wire 202 is electrically connected to the lamp body 210 and the other end is provided with a sub-wire connector 203. The two connection sub-wires 202 are connected in parallel or series so that multiple lamps 200 are electrically connected in parallel or series. In other embodiments, the power cord 201 of each lamp 200 may also have only one connection sub-wire 202.

In this embodiment, the lamp 200 is fixed to a keel member 110 through at least one lamp fixing member 220. The lower end of the lamp fixing member 220 is connected with the lamp body 210 and the upper end thereof is connected with the keel member 110.

The keel member 110 has a cross-sectional shape of "I" and extends to form an elongated member, which is known in the art. It consists of a keel riser 111 and a hanger platform 112. The keel riser 111 is arranged in a vertical direction while the hanger platform 112 is arranged horizontally so as to form a cross-sectional shape of a "I" or similar shape. The hanger platform 112 is used for installing the suspended ceiling tile 120 thereon, and adjacent keel risers 111 form a hanger hole 102 in which the suspended ceiling tile 120 is installed to achieve the purpose of installing the suspended ceiling tile 120 on the keel 100. Preferably, an upper flange 113 is convexly provided at the top end of the keel riser 111. The upper flange 113 may be rectangular or circular and protruded on the side wall of the keel riser 111 to form a slot 114 between the upper flange 113 and the hanger platform 112 on the side wall of the keel riser 111 for engaging the first arm part 241 in the slot 114.

The top surface of the lamp body 210 is provided with a lamp fixing slot 211. The lamp fixing slot 211 has an "L" or "I" shape in cross section for setting the lower end of the lamp fixing member 220 therein. Preferably, lamp body end caps 213 are provided at both ends of the lamp body 210 to cover the end face of the lamp body 210. A slot wall 212 is formed on the side wall of the lamp body fixing slot 211.

Figure 4:
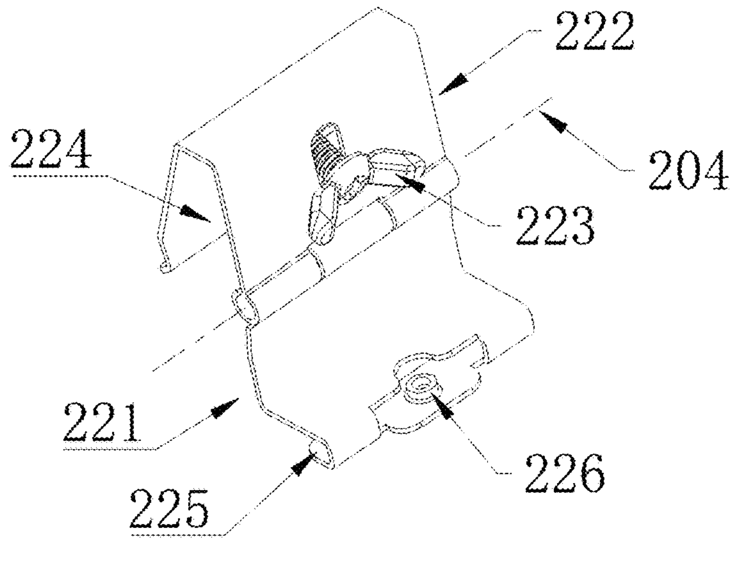
FIG. 4 is a structural schematic diagram of the lamp fixing member according to the embodiment shown in FIG. 1.
Figure 5:
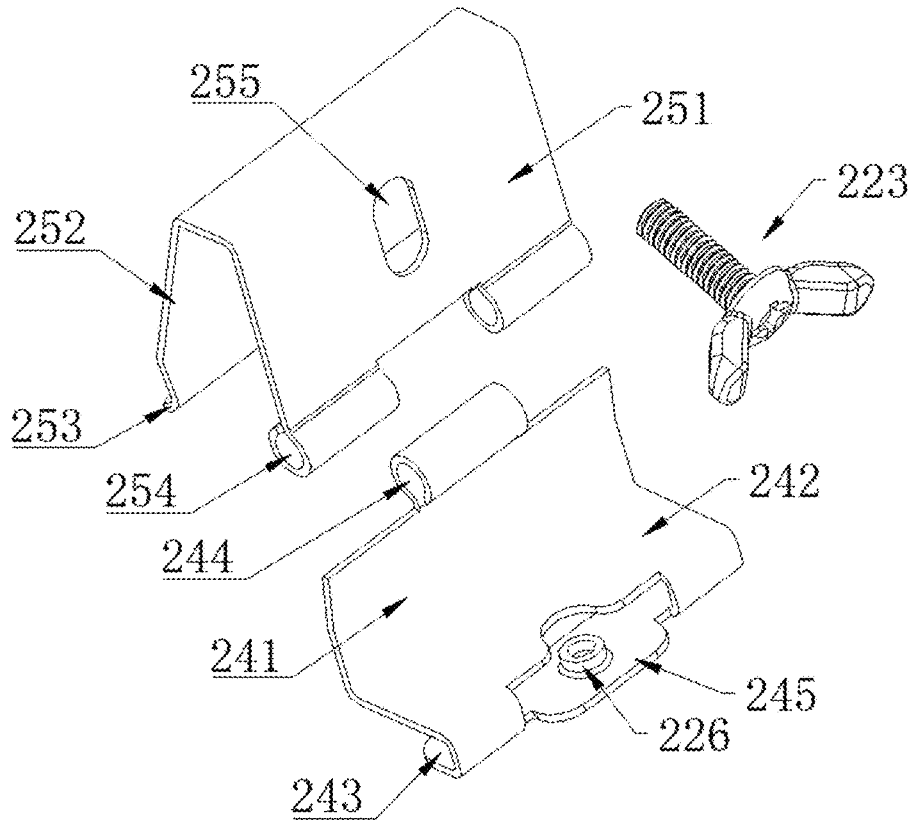
FIG. 5 is an exploded view of the structure in FIG. 4.
Figure 6:
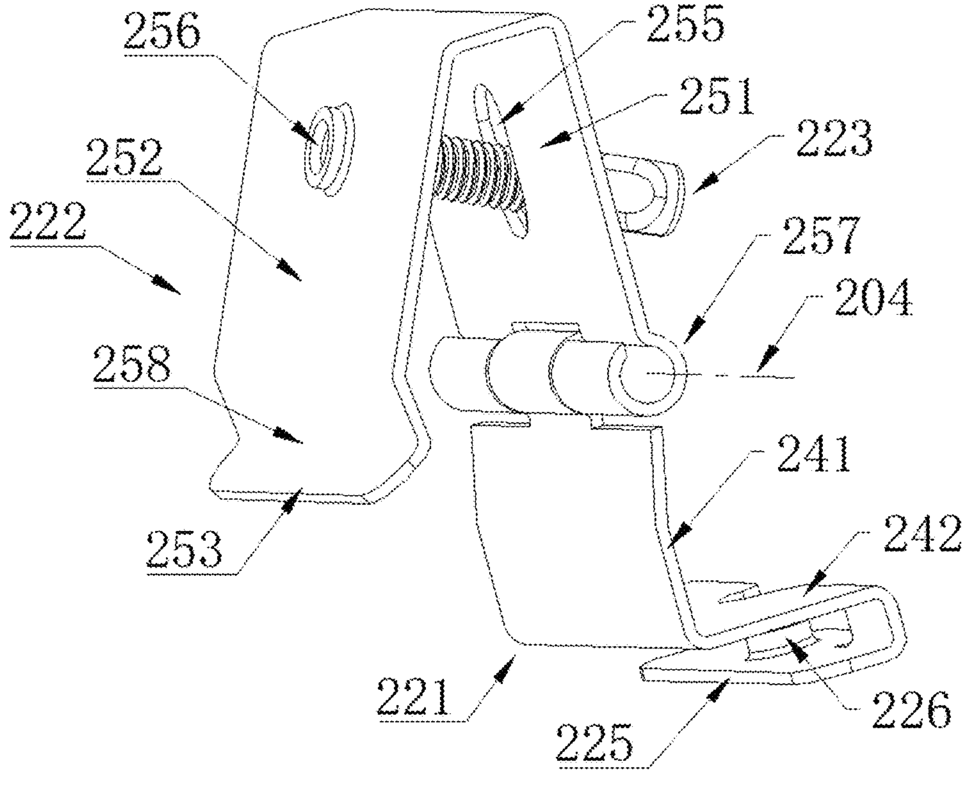
FIG. 6 is a structural schematic diagram of the back view of FIG. 4.

As shown in FIGS. 4-6, the lamp fixing member 220 of this embodiment is specifically composed of a first fixing member 221, a second fixing member 222 and a fastener 223. The upper end of the first fixing member 221 is pivotally connected to the lower end of the second fixing member 222 so that they form a pivotal connection and are rotatably arranged around the pivot axis 204. The lower end of the first fixing member 221 is connected to the lamp body fixing slot 211 of the lamp body 210.

Here, the second fixing member 222 is a U-shaped member or V-shaped member and arranged upside down to form a fastening slot 224 inside it for snap-fitting the keel riser 111. The fastener 223 is provided on the second fixing member 222 to tension or loosen the second fixing member 222 by rotation of the fastener 223. The tensioned second fixing member 222 is closely connected with the keel riser 111 to avoid separation of the lamp fixing member 220 from the keel riser 111. A connecting piece 225 and a first positioning piece 226 are formed at the lower end of the first fixing member 221. The connecting piece 225 is formed by bending the lower end of the first fixing member 221 so that the connecting piece 225 can be assembled and connected in the lamp body fixing slot 211; the first positioning piece 226 is protruded on the connecting piece 225. After the first fixing member 221 and the lamp body fixing slot 211 are assembled and connected, the first positioning piece 226 contacts with the slot wall 212 of the lamp body fixing slot 211, so that the lamp fixing member 220 and the lamp body 210 form a relative positioning without arbitrary movement.

In this embodiment, the first fixing member 221 is processed or molded from sheet material and mainly consists of a first arm part 241 and a second arm part 242. The first arm part 241 and the second arm part 242 are connected end-to-end and perpendicular to each other to form an L-shaped structure. A first pivot member 244 is provided at the upper end of the first arm part 241. The first pivot member 244 is preferably a pivot sleeve; the lower end of the second arm part 242 is bent downward to form a third arm part 243, the third arm part 243 is arranged in parallel and spaced from the second arm part 242 so that the third arm part 243 can be fitted to the lamp body fixing slot 211. A second positioning member 245 is further formed on the third arm part 243. The second positioning member 245 is formed by stamping the first arm part 241. The width of the second positioning member 245 is greater than that of the third arm part 243, preferably about equal to that of the lamp body fixing slot 211, so as to position and fit the first fixing member 221 in the lamp body fixing slot 211 through the second positioning member 245. The first positioning piece 226 is protruded on the third arm part 243 to contact with the slot wall 212, and the first positioning piece 226 and the second positioning piece 245 are formed as connecting positioning pieces.

The second fixing member 222 is a flat-bottomed V-shaped member and arranged upside down. The second fixing member 222 consists of the fourth arm part 251 and the fifth arm part 252, which are preferably integrally molded. A second pivot member 254 is formed at an outer end of the fourth arm part 251 on the side where the fastening slot 224 is further formed in the fourth arm part 251 and the fifth arm part 252. The second pivot member 254 is further preferably a pivot sleeve. After aligning and fitting the first pivot member 244 with the second pivot member 254, a pivot is inserted to form a pivotal connection between the first fixing member 221 and the second fixing member 222. Of course, in another embodiment, the first pivot member 244 and the second pivot member 254 may further be pivotally connected by one being a pivot sleeve and the other being a pivot.

A guide edge 253 is provided at the outer end of the fourth arm part 251 on the other side of the second fixing member 222, which has a beveled or curved configuration and is arranged outwardly to facilitate allowing the keel riser 111 to fit more conveniently to the fastening slot 224 when the second fixing member 222 pivots.

The first fastening holes 255 are respectively provided on the two fourth arm parts 251, and fasteners 223 act in the two first fastening holes 255 to tension or loosen the two fourth arm parts 251; for example, a track-shaped through hole is provided on the fourth arm part 251 as the first fastening hole 255 and a threaded hole is provided on the fifth arm part 252 as the second fastening hole 256.

Optimally, the fastener 223 is a butterfly bolt which threads into the second fastening hole 256 after passing through the first fastening hole 255. The butterfly bolt is screwed to resist against the fourth arm part 251 and pressed or loosened toward the fifth arm part 252. In other embodiments, the fastener 223 may be compressed or unscrewed with a threaded fit between the first fastening hole 255 and the second fastening hole 256, or the second fastening hole 256 may be a through hole to compress or unscrew the fourth and fifth arm parts by threading the fastener 223 at an outer side of the fifth arm part 252 by an additionally provided nut.

Optimally, as shown in FIG. 3, the lamp 200 further has a cable fixing member 270, the cable fixing member 270 is used for fixing the power cord 201 to the keel member 110, such as fixing the connection between the lower end of the power cord 201 and the lamp 200 to the keel member 110, so that the electrical connection between the power cord 201 and the lamp 200 is not easy to be damaged. The power cord 201 can also be bent and fixed to ensure that the suspended ceiling tile 120 (e.g., gypsum tile) is flat after installation without being raised.

Figure 7:
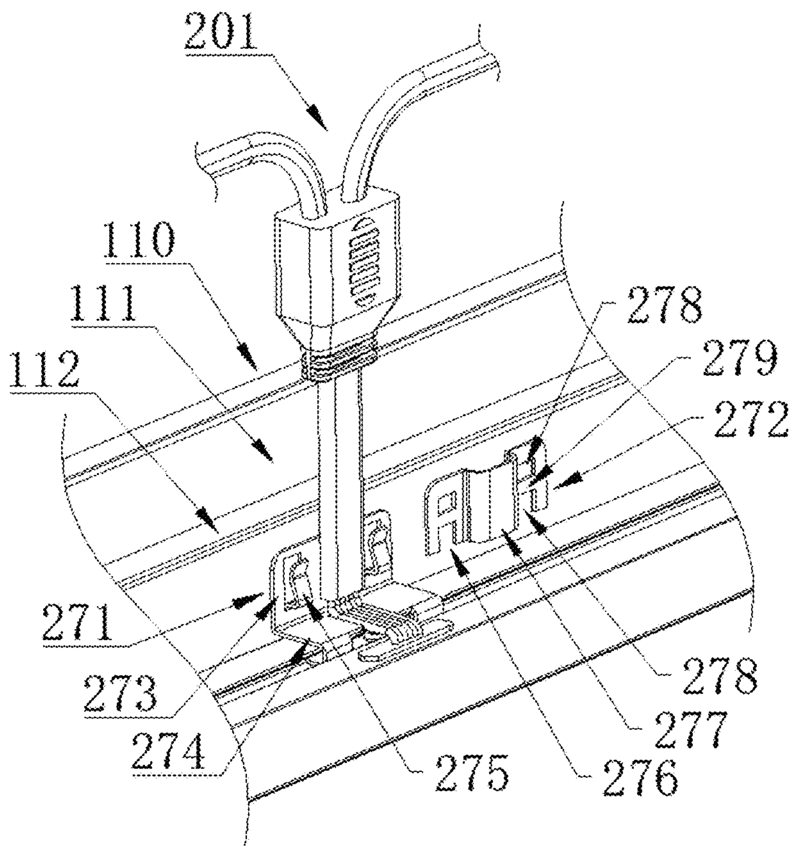
FIG. 7 is an exploded view of the cable fixing member according to the embodiment shown in FIG. 1.
Figure 8:
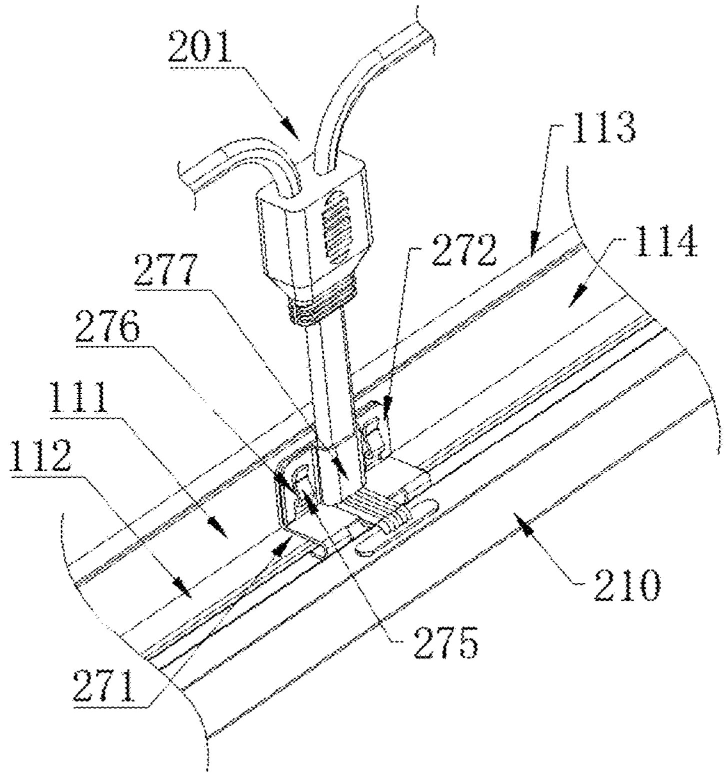
FIG. 8 is a schematic diagram of the fitting effect of the cable fixing member shown in FIG. 7.

As shown in FIG. 7-8, the cable fixing member 270 comprises a cable fixing body 271 and a cable fixing buckle 272 detachably connected with each other. The power cord 201 is fixed on the cable fixing body 271 by the cable fixing buckle 272. Here, the cable fixing body 271 is generally in an L-shaped shape and has a first body 273 and a second body 274 which are adjacently connected or integrated with each other. The second body 274 has a structure similar to that of the second arm part 242 for connecting with the lamp body fixing slot 211 and fastening the cable fixing body 271 to the hanger platform 112 of the keel member 110. The first body 273 is fitted to the side wall of the keel riser 111, and the assembled structure is as shown in FIG. 8. The cable fixing buckle 272 comprises a cable trough 277 and second buckling pieces 276 formed on both sides of the cable trough 277, while the first body 273 is correspondingly provided with a first buckling piece 275. The cable trough 277 is used to receive the power cord 201 therein for fixing it. The first buckling piece 275 and the second buckling piece 276 form a detachable structure. The cable fixing buckle 272 is detachably connected to the cable fixing body 271. For example, in this embodiment, the first buckling piece 275 is a card stamped and formed on the cable fixing body 271. It is an elastic member with clamping protrusions, while the second buckling piece 276 is a set of buckle holes, which comprises two buckle holes 278 spaced apart and a clamping table 279 formed between the two buckle holes 278. During use, the cable fixing body 271 is first installed in the lamp body fixing slot 211 and fixed on the keel 110 together with the lamp fixing member 220. The power cord 201 is fitted to the cable fixing body 271 and then the cable fixing buckle 272 is fitted from top to bottom so that the first buckling piece 275 is fastened with the second buckling piece 276, even if the clamping convex of the first buckling piece 275 is clamped into the clamping table 279. During removal, it is only necessary to move the cable fixing buckle 272 upward.

Embodiment II

Figure 9:
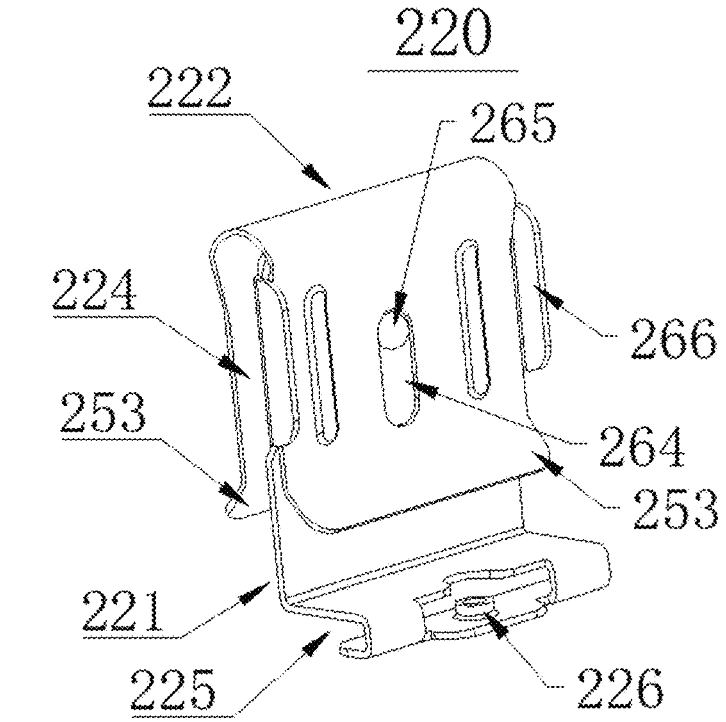
FIG. 9 is a structural schematic diagram of the lamp fixing member according to Embodiment II of the present invention.
Figure 10:
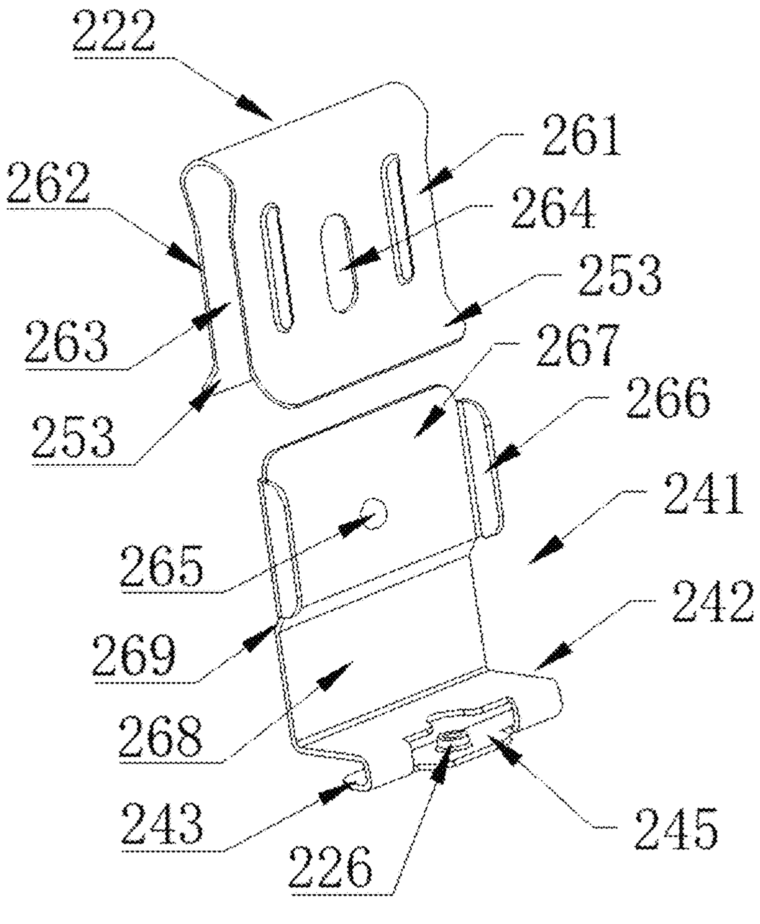
FIG. 10 is an exploded view of the structure in FIG. 9.

As shown in FIGS. 9-10, the main structure of a lamp fixing member is similar to that of Embodiment I, except that the connection mode between the lamp fixing member 220 and the keel riser 111 in this embodiment is different from that in Embodiment I. The lamp fixing member 220 is changed from being pivotally buckled with the keel riser 111 to being detachably buckled.

In this embodiment, the lamp fixing member 220 is composed of a first fixing member 221 and a second fixing member 222. The second fixing member 222 is detachably assembled on the first fixing member 221 to be snap-fitted to or separated from the first fixing member 221. When the second fixing member 222 is snap-fitted to the first fixing member 221, a snap-fit state as shown in FIG. 9 will be formed; when the second fixing member 222 is separated from the first fixing member 221, a disconnected state as shown in FIG. 10 will be formed.

The second fixing member 222 is a U-shaped member, which is preferably made of sheet material by bending or molding. The second fixing member 222 has the sixth arm part 261 and the seventh arm part 262 spaced from each other. The sixth arm part 261 is connected or integrated with the inner end of the seventh arm part 262. The outer ends are respectively provided with guide edges 253 to play a guiding role during snap-fit; of course, the guide edge 253 may not be provided regardless of the guiding effect at the time of snap-fit. A snap-fit cavity 263 is provided between the sixth arm part 261 and the seventh arm part 262. The snap-fit cavity 263 is used to snap-fit the keel riser 111 with the second fixing member 222 when the second fixing member 222 fits on the side wall of the keel riser 111. The sixth arm part 261 is further provided with a fastening slot 264. The fastening slot 264 is preferably in the shape of a track or an elongated strip, or a plurality of fastening slots spaced from each other along the snap-fit direction, so as to achieve the purpose of allowing the second fixing member 222 to be snap-fitted to the first fixing member 221 at different positions to meet the assembly needs of different keel risers 111.

The first fixing member 221 is formed by bending or molding a sheet-like material, and the first fixing member 221 has a generally L shape so as to form two arm parts which are relatively vertical or nearly vertical. One arm part fits to the side of the keel riser 111 substantially in parallel while the other arm part extends in parallel with the suspended ceiling tile. The arm part parallelly fitted to the keel riser 111 is specifically composed of an eighth arm part 267 and a ninth art part 268, the eighth arm part 267 is provided at the upper end of the ninth arm part 268, a lower end of the ninth arm part 268 is connected or integrated with the second arm part 242. The ninth arm part 268 is offset from and protruded relative to the eighth arm part 267, and a boss 269 is formed at the connection therebetween. The eighth arm part 267 is further provided with a fastening point 265, the fastening point 265 is used to snap-fit in the fastening slot 264 of the sixth arm part 261 so that the second fixing member 222 and the first fixing member 221 form a stable snap-fit connection.

Preferably, limiting pieces 266 are respectively provided on both sides of the eighth arm part 267. The limiting piece 266 is preferably formed by bending to limit the second fixing member 222 during snap-fit and form a stable snap-fit whole.

In this embodiment, the snap-fit structure of the second arm part 242 is the same as that of the lamp body fixing slot 211, i.e., it further comprises the third arm part 243, the first positioning member 226 and the second positioning member 245, which will not be repeated here.

The use process of this embodiment is as follows:

First, fit the first fixing member 221 to one side of the keel riser 111. At this moment, the second arm part 242 and the lamp body 210 may be pre-connected together to install the lamp body 210 and the first fixing member 221 at the same time, or the second arm part 242 may not be connected with the lamp body 210 but only the first fixing member 221 may be installed first.

Then, snap-fit the second fixing member 222 from top to bottom so that at least a part of each of the keel riser 111 and the first fixing member 221 is snap-fitted to be received in the snap-fit cavity 263 to complete the installation.

The width of the snap-fit cavity 263 of the second fixing member 222 is less than or equal to the overall width after the first fixing member 221 fits to the keel riser 111, so that the first fixing member 221 is firmly fixed to the keel riser 111 without being prone to shaking. Preferably, the second fixing member 222 is made of an elastic material and the width of the snap-fit cavity 263 is smaller than the above-mentioned overall width so that the second fixing member 222 is deformed after the snap-fit assembly. Therefore, a force can be continuously applied to the first fixing member 221 to fit and fix it to the keel riser 111. Preferably, the eighth arm part 267 or the ninth arm part 268 is further provided with ribs or beads and arranged in a snap-fit direction so that the eighth arm part 267 or the ninth arm part 268 can provide better elastic fixing force.

Embodiment III

Figure 11:
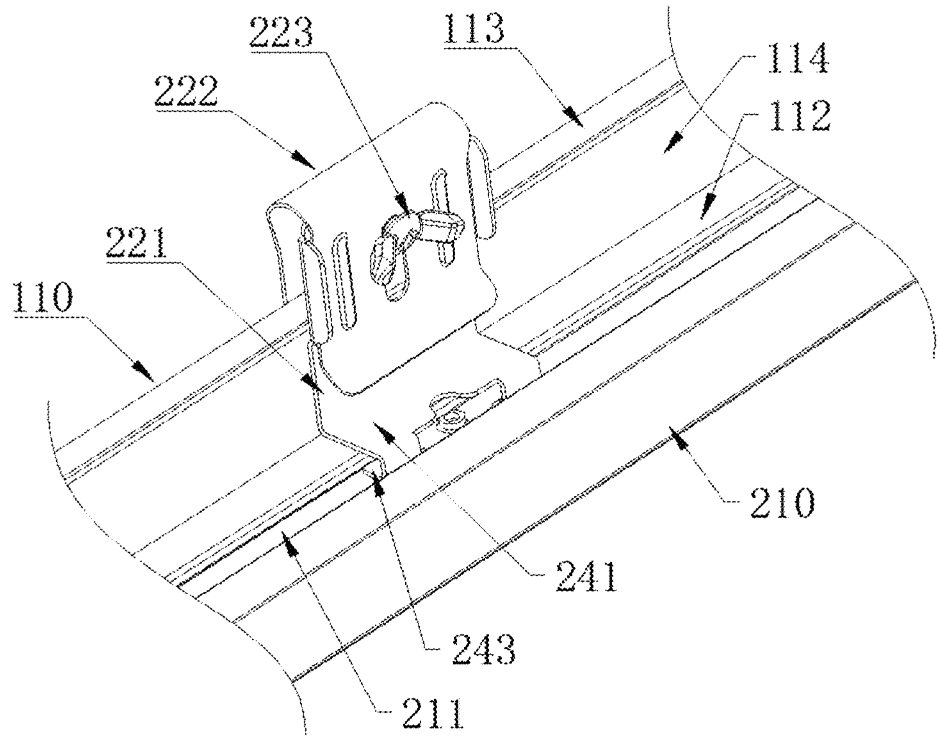
FIG. 11 is an assembly diagram of the lamp fixing member according to Embodiment III of the present invention.

As shown in FIG. 11, the main structure of a lamp fixing member is similar to that of Embodiment II, except that this embodiment comprises the fastener 223 to firmly connect the lamp fixing member 220 to the keel riser 111 through the fastening effect of the fastener 223 with the first fixing member 221 or the second fixing member 222.

Specifically, unlike the elastic deformation snap-fit of the second fixing member 222 in Embodiment II, this embodiment adopts a fastener tightening method similar to that in Embodiment I.

To this end, the fastening slot 264 and the fastening point 265 in Embodiment II are canceled and replaced by the first fastening hole 255 in Embodiment I, and a second fastening hole 256 is correspondingly provided on the ninth arm part 268 of the second fixing member 222. The fastener 223 is fastened to the first fastening hole 255 and the second fastening hole 256, thus pressing or loosening the second fixing member 222.

Preferably, the fastener 223 is a butterfly bolt. The first fastening hole 255 is a through hole and the second fastening hole 256 is a threaded hole to facilitate operation. Preferably, both the first fastening hole 255 and the second fastening hole 256 are provided at a position higher than the keel riser 111 so that the fastener 223 is threaded above the keel riser 111. Optimally, the second fastening hole 256 is arranged higher than the first fastening hole 255 so that the fastener 223 is obliquely assembled on the second fixing member 222.

Embodiment IV

Figure 12:
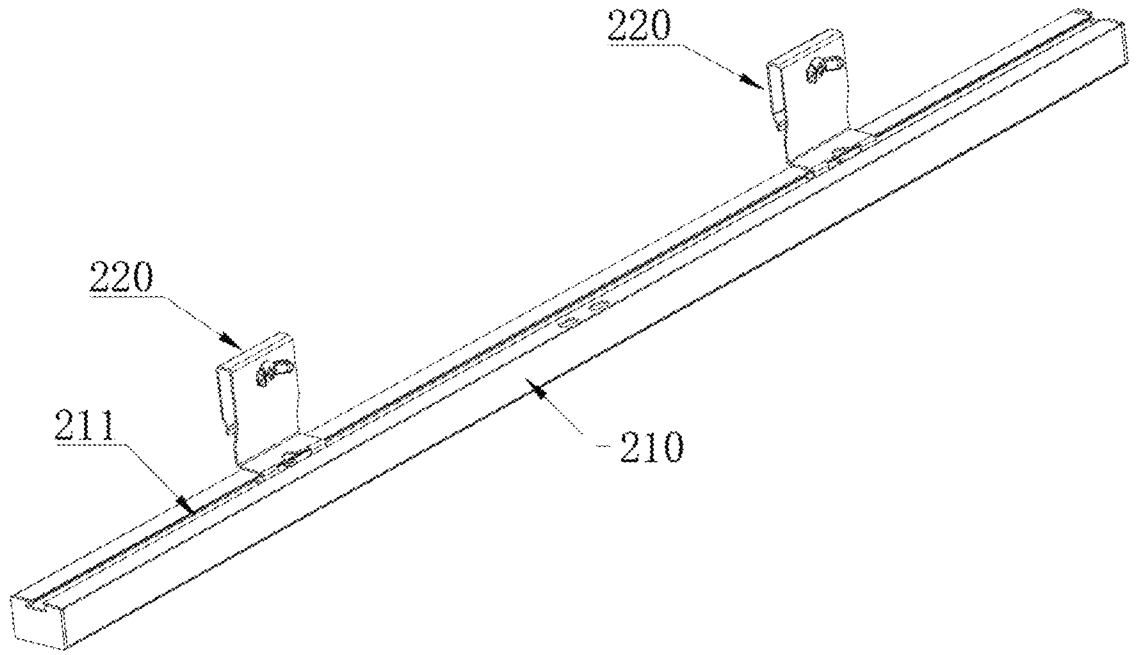
FIG. 12 is a structural schematic diagram of the lamp according to Embodiment IV of the present invention.
Figure 13:
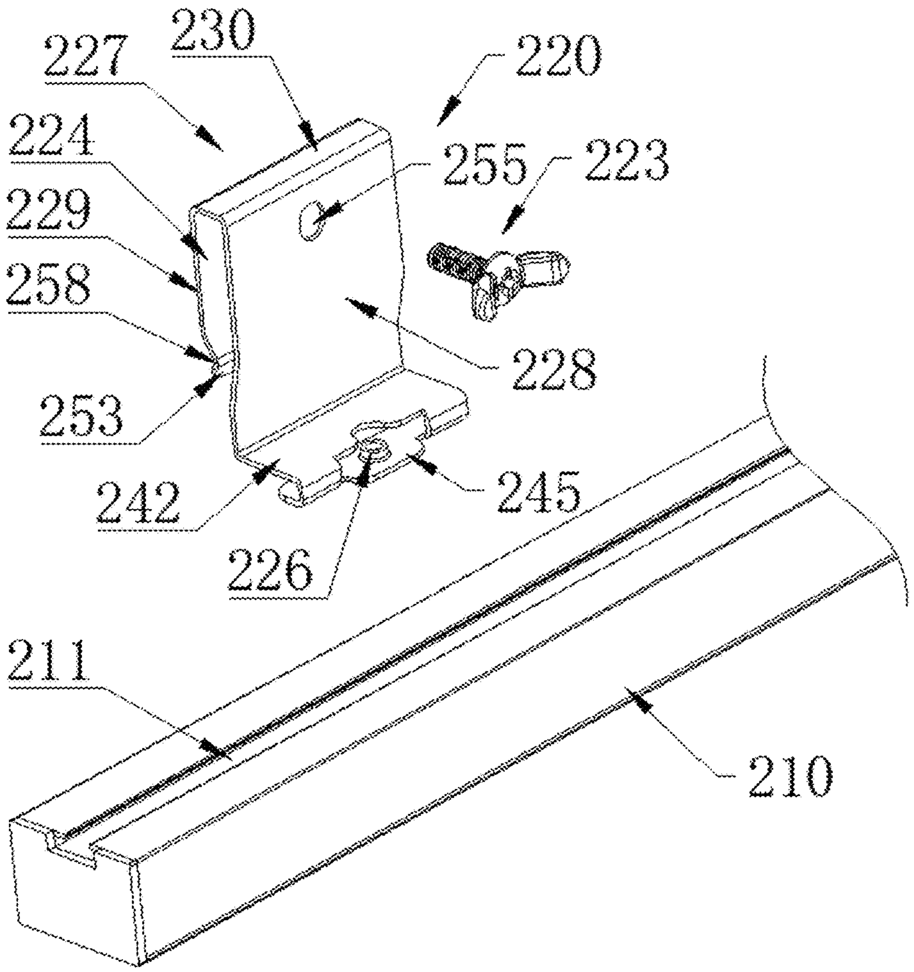
FIG. 13 is an exploded view of the partial structure according to the embodiment shown in FIG. 12.
Figure 14:
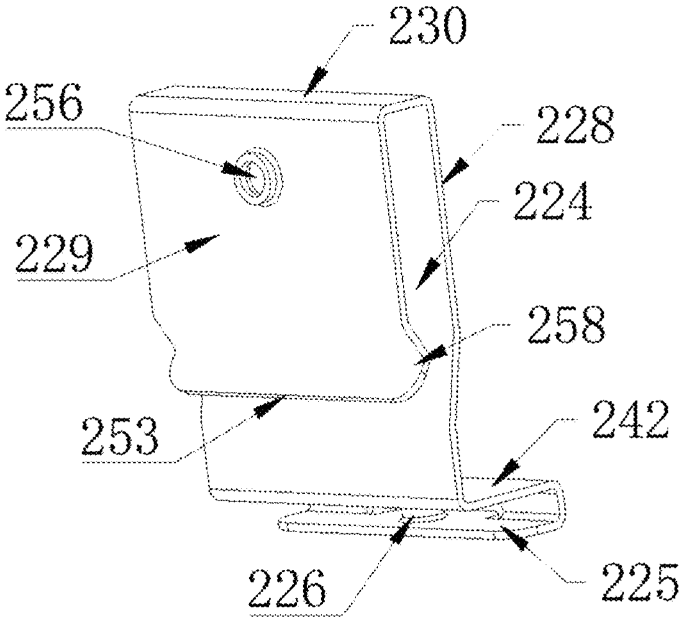
FIG. 14 is a structural schematic diagram of the third fixing member according to the embodiment shown in FIG. 12.
Figure 15:
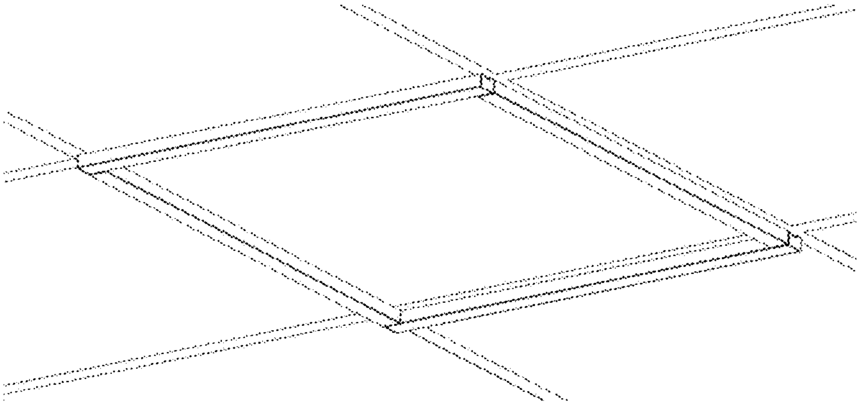
FIG. 15 is a schematic diagram I of the assembled state of the lamp fixing structure according to the present invention, wherein each lamp body is arranged in a square layout and its length relative to two lamp bodies is greater than that of the other two lamp bodies; in some embodiments, the lamp bodies with equal length can be staggered to form a square layout.
Figure 16:
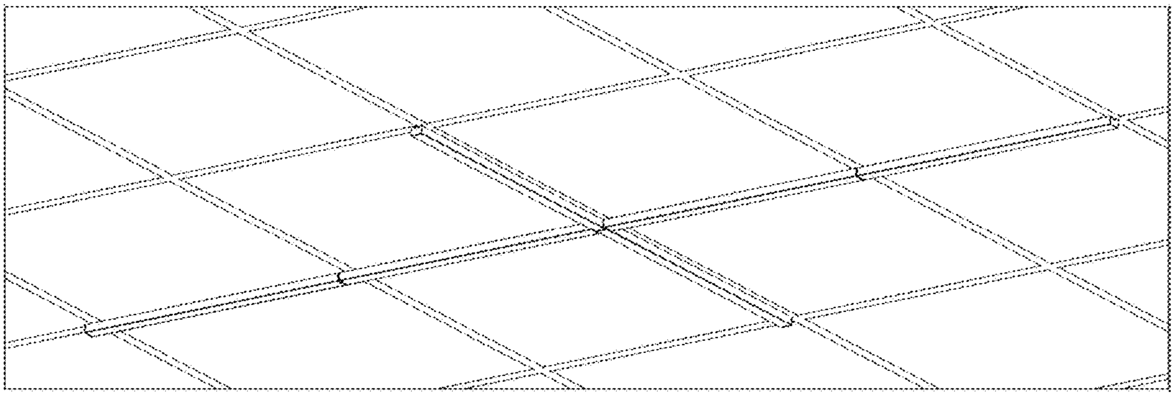
FIG. 16 is a schematic diagram II of the assembled state of the lamp fixing structure according to the present invention, wherein multiple lamp bodies are arranged in a cross-shaped layout.
Figure 17:
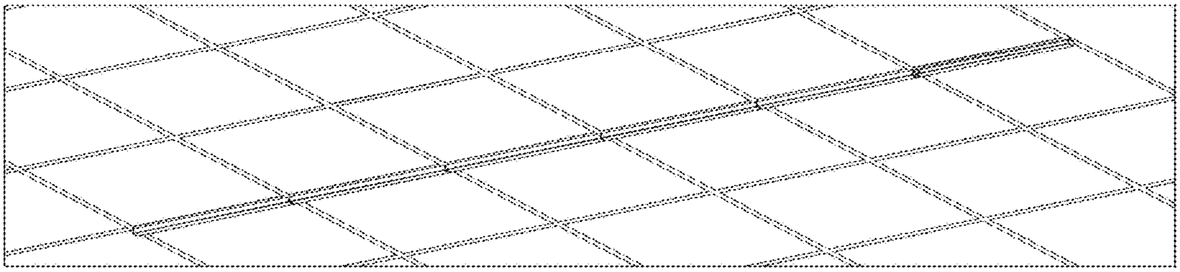
FIG. 17 is a schematic diagram III of the assembled state of the lamp fixing structure according to the present invention, wherein multiple lamp bodies are arranged in a straight line.
Figure 18:
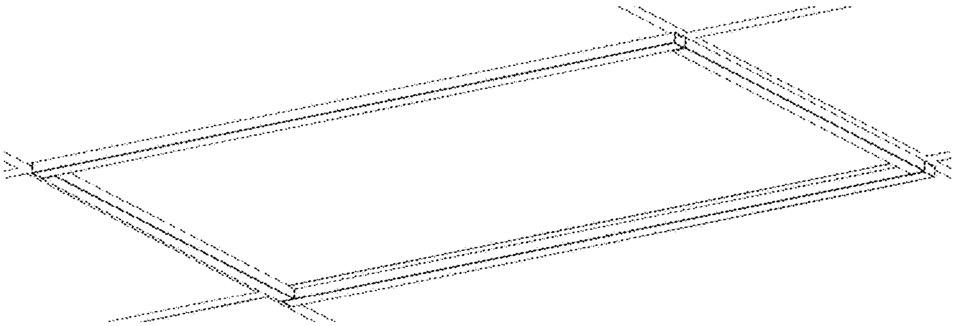
FIG. 18 is the schematic diagram IV of the assembled state of the lamp fixing structure according to the present invention, wherein each lamp body is arranged in a rectangular layout, and the shorter lamp body is sandwiched between two longer lamp bodies.
Figure 19:
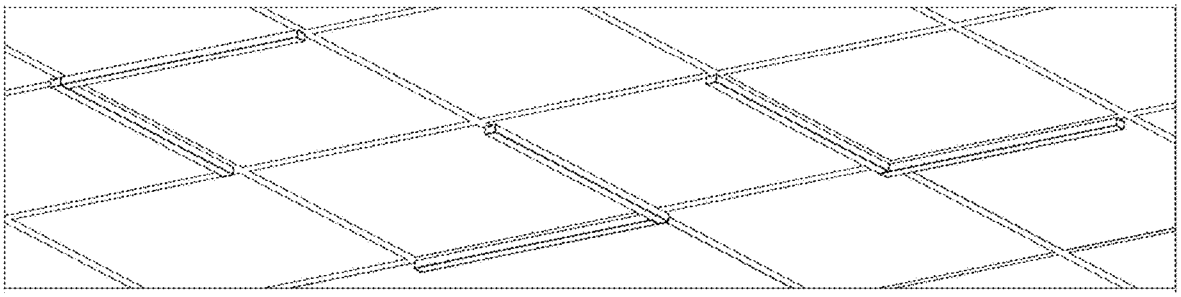
FIG. 19 is a schematic diagram V of the assembled state of the lamp fixing structure according to the present invention. The lamp body is arranged in an "L" shape, and the lengths of each lamp body may be equal or unequal.

As shown in FIGS. 12-14, a lamp 200 comprises a lamp body 210 and two lamp fixing members 220 so that the lamp 200 can be fixed to the keel member 110 by the two lamp fixing members 220.

Here, the specific structure of the lamp body 210 is the same as that in Embodiments I to III, and a lamp body fixing slot 211 is provided on it for connecting the lamp fixing member 220 in it. In addition, the lower end of the lamp fixing member 220 is provided with a second arm part 242, a third arm part 243, a first positioning member 226 and a second positioning member 245 to connect the lamp fixing member 220 with the lamp body 210. This is the same as that in Embodiments I to III, and will not be repeated here, so that the lamp fixing member 220 is detachably connected with the lamp body 210 at the lower end. After the lamp fixing member 220 is fixed to the keel member 110, the lamp body 210 and the lamp fixing member 220 are connected to realize the installation of the lamp 200.

As shown in FIGS. 13-14, the lamp fixing member 220 in this embodiment is composed of a third fixing member 227 and a fastener 223. The third fixing member 227 is used to connect to the keel member 110 and press or unscrew the third fixing member 227 by screwing the fastener 223 so that the third fixing member 227 can be fixedly connected with or detached from the keel member 110. The third fixing member 227 is an integral member, which consists of a connecting arm 228, a locking arm 229 and a second arm part 242. They are integrated by bending or welding. The locking arm 229 is connected to the upper end of the connecting arm 228 by a top arm 230, and the second arm part 242 is connected to the lower end of the connecting arm 228. Locking arms 229 are spaced from connecting arms 228 to form a fastening slot 224 therebetween for at least partially receiving keel member 110 therein. A clamping convex 258 is further provided at the lower end of the locking arm 229, and a guide edge 253 is provided below the clamping convex 258.

In which, the connecting arm 228 is provided with a first fastening hole 255, the locking arm 229 is provided with a second fastening hole 256 correspondingly, and the fastener 223 is provided between the first fastening hole 255 and the second fastening hole 256 so that the fastener 223 can act on the connecting arm 228 and the locking arm 229 to approach or move away from each other through placement of it to press or unscrew the lamp fixing member 220. Preferably, the fastener 223 is a butterfly bolt. The first fastening hole 255 is a through hole and the second fastening hole 256 is a threaded hole. After the butterfly bolt passes through the first fastening hole 255, it threads into the second fastening hole 256.

Therefore, the lamp fixing member 220 of this embodiment is different from Embodiments I to III in that:

1. The lamp fixing member 220 and the lamp body 210 of Embodiments I to III have two assembly modes: Firstly, the lamp fixing member 220 and the lamp body 210 are assembled as a whole, and then the lamp fixing member 220 is connected and fixed on the keel member 110. For example, in Embodiment I, the first fixing member 221 is fitted to one side of the keel member 110, and then the second fixing member 222 is pivoted to form a connection relationship. Then the fifth arm part 252 of the second fixing member 222 is tightened relative to the fourth arm part 251 by screwing the fastener 223, so as to realize the purpose of connecting and fixing the lamp fixing member 220 on the keel member 110. For another example, in Embodiment II, the first arm part 241 of the first fixing member 221 is fitted to one side of the keel member 110, and then the second fixing member 222 is pressed and buckled downward. The sixth arm part 261 and the seventh arm part 262 of the second fixing member 222 respectively act on both sides of the keel member 110 to realize the purpose of connecting and fixing the lamp fixing member 220 to the keel member 110. For another example, in Embodiment III, in addition to the steps in Embodiment II, the sixth arm part 261 and the seventh arm part 262 are relatively tightened by providing fasteners 223 to realize the purpose of connecting and fixing the lamp fixing member 220 on the keel member 110. Secondly, the two steps of the first assembly method can also be reversed, i.e. connecting and fixing the lamp fixing member 220 to the keel member 110, and then assembling and connecting the lamp fixing member 220 with the lamp body 210. The specific contents are the same as those of the first assembly method and will not be repeated here.
2. In this embodiment, the fixed connection of the lamp body 210 can only be completed by connecting and fixing the lamp fixing member 220 to the keel member 110 first, and then assembling and connecting the lamp body 210 with the lamp fixing member 220. Here, the preliminary positioning is completed after the lamp fixing member 220 and the keel member 110 are assembled. After that, the fastener 223 can be screwed first to completely fix it, and then the lamp body 210 and the lamp fixing member 220 can be assembled and connected. Alternatively, after the preliminary positioning, the lamp body 210 and the lamp fixing member 220 can be assembled and connected first, and then the fastener 223 can be screwed to fully fix the lamp 200.

What is claimed is:

1. A lamp fixing member for fixing a lamp body to a keel member, comprising:

a first fixing member, the first fixing member is connected with the lamp body, and a second fixing member, the first fixing member is movably connected with the second fixing member to form a connected state or a disconnected state;

wherein, the second fixing member fixes the first fixing member to the keel member in the connected state, and the first fixing member is detachable from the keel member in the disconnected state;

the second fixing member is pivotally connected to the first fixing member for snap-fitting on or separating from the keel member by pivoting of the second fixing member; the lamp fixing member further comprises a fastener; the second fixing member comprises a fourth arm part and a fifth arm part, and the fourth arm part is pivotally connected with the first fixing member; the fourth arm part and the fifth arm part are respectively provided with a first fastening hole and a second fastening hole; the fastener is inserted into the first fastening hole and the second fastening hole to drive the fifth arm part to approach or move away from the fourth arm part by screwing of the fastener;

or, the second fixing member is detachably connected to the first fixing member to snap-fit the keel member on or separate it from the first fixing member through the second fixing member; the second fixing member comprises a sixth arm part and a seventh arm part, the sixth arm part and the seventh arm part are spaced apart so as to form a snap-fit cavity therebetween; the first fixing member comprises a first arm part and a second arm part, the first arm part is connected with or integrated with the second arm part, and the first arm part fits to a side wall of the keel member and is fixed by the second fixing member in a snap-fit manner; the second fixing member is made of an elastic material so that it can be elastically snap-fitted, and the width of the snap-fit cavity is less than the fitting width between the first arm part and the keel member, so that the second fixing member is in a resiliently expanded state after being snap-fitted; or, the lamp fixing member further comprises a fastener; the first arm part and the sixth arm part are provided with a first fastening hole correspondingly, and the seventh arm part is provided with a second fastening hole; the fastener is inserted into the first fastening hole and the second fastening hole to drive the sixth arm part to approach or move away from the seventh arm part by screwing of the fastener.

2. The lamp fixing member according to claim 1, wherein when the second fixing member is pivotally connected, the first fixing member comprises a first arm part and a second arm part, the first arm part is connected with or integrally formed with the second arm part, the fourth arm part is pivotally connected with the first arm part, and the second arm part is connected with the lamp body;

A pivotal part of the first fixing member and the second fixing member is convexly arranged to abut against the lower part of an upper flange of the keel member.

3. The lamp fixing member according to claim 2, wherein the first fastening hole is a through hole, and the second fastening hole is a threaded hole; or both the first fastening hole and the second fastening hole are through holes, and a nut is provided outside the second fastening hole to threadably engage with the fastener; and/or, the fastener is a butterfly bolt, the fifth arm part is further provided with a clamping convex, and a guide edge is further arranged below the clamping convex.

4. The lamp fixing member according to claim 1, wherein when the second fixing member is detachably connected, the first arm part comprises an eighth arm part and a ninth arm part, the ninth arm part is offset from and protruded relative to the eighth arm part, and a boss is formed at the connection therebetween; or, when the second fixing member is elastically snap-fitted, a fastening slot and a fastening point are provided on the sixth arm part and the first arm part, respectively; the fastening slot is in concave-convex fit, friction fit or magnetic fit with the fastening point to position the second fixing member.

5. A lamp fixing member for fixing a lamp body to a keel member, comprising:

a third fixing member, the third fixing member is fixedly connected to the keel member, and the third fixing member is detachably connected with the lamp body, and a fastener, wherein, the third fixing member comprises a connecting arm and a locking arm arranged on both sides of the keel member, respectively, a fastening slot for providing at least part of the keel member therein is formed between the connecting arm and the locking arm, and the fastener acts between the connecting arm and the locking arm to press or unscrew them.

6. The lamp fixing member according to claim 5, wherein the connecting arm and the locking arm are provided with a first fastening hole and a second fastening hole, respectively, and the connecting arm is detachably connected with the lamp body through a second arm part;

the first fastening hole is a through hole, and the second fastening hole is a threaded hole; the fastener is inserted into the first fastening hole and threadably engaged with the second fastening hole; or the first fastening hole and the second fastening hole are both through holes, and the fastener passes through the first fastening hole and the second fastening hole to form a threaded engagement with the nut.

7. The lamp fixing member according to claim 6, wherein the fastener is a butterfly bolt.

8. The lamp fixing member according to claim 5, wherein a lower end of the second arm part is bent downwards to form a third arm part, and the third arm part is spaced from the second arm part; the third arm part is further provided with a connecting positioning piece, and the connecting positioning piece abuts against a side wall or an inner wall of the lamp body fixing slot of the lamp body.

9. The lamp fixing member according to claim 8, wherein the third arm part is arranged in parallel and spaced from the second arm part, and the connecting positioning piece comprises either a first positioning piece protruding on the third arm part or a second positioning piece formed on the third arm part.

10. A lamp, comprising a lamp body and at least one lamp fixing member, wherein the lamp fixing member is the lamp fixing member according to claim 1.

11. A lamp fixing structure, comprising a keel member, a lamp body and a lamp fixing member, wherein the lamp fixing member is the lamp fixing member according to claim 1.

12. The lamp fixing structure according to claim 11, wherein the keel member comprises a keel riser, and an upper flange is formed at the top of the keel riser for clamping a locking part of the lamp fixing member below it; or, a lamp body fixing slot is provided on the top surface of the lamp body, and the lamp body fixing slot has an "L" or "⊥" cross-sectional shape.

13. The lamp fixing structure according to claim 12, wherein a hanger platform is further provided at a lower end of the keel riser, and the second arm part is arranged fitting to the hanger platform, so that the suspended ceiling tile is carried by the second arm part and the lamp body is arranged adjacent to a lower surface of the keel member or the suspended ceiling tile;

the third arm part is positioned in a tight or magnetic fit with the lamp body fixing slot, so that the position of the lamp body can be adjusted relative to the lamp fixing member;

the lamp fixing structure further comprises a cable fixing member, the cable fixing member comprises a cable fixing body and a cable fixing buckle detachably connected with each other; the cable fixing body comprises a first body and a second body, and the second body is fixedly connected with the keel member and the lamp body; the cable fixing buckle comprises a cable trough and a second buckling piece, a first buckling piece is provided on the first body, and the first buckling piece is detachably connected with the second buckling piece.

14. The lamp fixing structure according to claim 11, wherein after assembly, the lamp fixing structure makes each lamp body in a linear, rectangular or cross-shaped layout.

* * * * *